Patented Apr. 11, 1939

2,153,960

UNITED STATES PATENT OFFICE 2,153,960

PURIFICATION OF ARYL AMINES

Russell L. Jenkins, Anniston, Ala., assignor, by mesne assignments, to Monsanto Chemical Company, a corporation of Delaware No Drawing. Application October 18, 1934, Serial No. 748,896

10 Claims. (Cl. 260—582)

This invention relates to the separation and purification of aryl amines, particularly the purification from inorganic salts or compounds.

One object of this invention is the provision of a process for the recovery of aromatic amines from such inorganic reagents and associated organic impurities as are used or produced in the production of aromatic amines. Another object is the provision of a process for the recovery of aminodiphenyl in pure form from the crude reaction product, and in a form suitable for distillation. A further object is separation of the aminodiphenyl from the ammonolysis reaction mixture in such form as to make possible a nearly quantitative recovery of the ammonia, copper, and hydroxydiphenyl, each of which is valuable.

In the manufacture of aryl amines it is customary to subject aryl halides to the action of aqueous ammonia in the presence of a catalytic agent together with other reagents, which, under the influence of heat and pressure, yield the corresponding primary amine.

Such a reaction is ordinarily carried out intermittently in pressure vessels or continuously in tubular reaction coils, and the product of the reaction discharged either intermittently or continuously, depending upon the method of working. The reaction mixture thus discharged contains the following ingredients:—water, calcium chloride, ammonia, a soluble copper salt or copper ammonia complex, phenolic bodies, small amounts of tars and unidentified by-products and the main product, an aryl amine. My present invention is concerned with the recovery of the arylamine in pure form by a simple and direct method from the above-mentioned reagents and reaction products.

Previously known methods involve the gravity separation of the arylamine layer, followed by distillation, as in the case of aniline. This method may be applied to other arylamines, provided they are water insoluble; however, it is found that an appreciable amount of the reaction mixture, notably the inorganic and organic products occurring in the reaction mixture, are carried along with the desired product, contaminating the same. On subsequent distillation, therefore, an undesirably large amount of residue is left behind in the still boiler, making for difficulty in distillation as well as making the recovery of by-products difficult or impossible.

I have now discovered that if the molten arylamine is dispersed in an aqueous medium and cooled through its freezing point with agitation, it will form small congealed spheres which can be readily filtered and washed free of impurities. At the same time the hydroxydiphenyl appears as separate crystals, probably as a molecular compound with the amine. The degree of dispersion necessary is that which is just sufficient to form a rather coarse emulsion which will not break when the stirring is discontinued.

While my process of purification is applicable to any water insoluble arylamine, which solidifies at a temperature suitable for centrifuging or filtering, I have found it to be particularly valuable when treating para-aminodiphenyl, and the specific embodiment of my invention will be described in connection with the purification of this product.

When producing this material by autoclaving a parachlorodiphenyl with ammonia, water, lime and a copper catalyst, the reaction product will contain in addition to para-aminodiphenyl, ammonia, water, calcium chloride, free lime, a copper compound, traces of hydroxydiphenyl and some unreacted chlorodiphenyl, together with unidentified tarry materials. This reaction mixture is discharged from the autoclave and collected in a receiver, the temperature of the mass being lowered during the discharge. I now add to the reaction product approximately an equal volume of water, and heat the resulting solution to above the melting point of the para-aminodiphenyl, say to 80 or 90° C., and agitate it until a good dispersion of the molten amine in the solution is obtained. When this condition is obtained, I cool the dispersion or emulsion below the melting point of the para-aminodiphenyl, stirring meanwhile.

When the temperature of the dispersion is below the melting point of the para-aminodiphenyl, the entire mass may be filtered or centrifuged and a fairly pure product obtained. The soluble constituents, namely, the copper salt, ammonia, and calcium chloride, will be recovered from the filtrate. Because of the uniformity of the degree of dispersion and spherical nature of the amine particles, the product may be easily and efficiently washed during filtration or on the centrifuge.

If a greater degree of purity is required, the treatment outlined above is repeated one or more times, the amine being suspended in warm water, emulsified and cooled as above. The filtrate from the second treatment will contain additional quantities of soluble compounds which may be recovered by further treatment.

If the amine is to be distilled before further treatment, and the hydroxydiphenyl separated, the final treatment may be carried out in a 1% caustic soda solution. This treatment is in all respects similar to that outlined above except that the amine is suspended in warm dilute caustic soda solution, emulsified, cooled and filtered or centrifuged. The caustic soda treatment dissolves the hydroxydiphenyl present. The washing of the amine on the filter or in the centrifuge is carried out with dilute caustic soda solution instead of with water. The caustic soda treatment may be repeated one or more times, depending upon the purity desired.

The amine thus purified and dried may be charged to a still boiler and distilled with good recovery of a pure product.

My process may be applied to the purification of other arylamines, provided they are insoluble or substantially insoluble in water when solid. As examples of such amines which may be so treated, I mention ortho-aminodiphenyl, alpha-naphthylamine, etc. The only requirement is that the amine must be solid at the temperature of filtration. In general, my process is applicable, as is apparent, to the purification of such arylamines from any water-soluble impurities.

Having now particularly described my invention and the manner in which it may be used, it will be apparent that it is susceptible to various changes and modifications without departing from the spirit thereof, and I desire that no limitations be placed thereupon except as indicated by the prior art or as specifically set out in the appended claims.

What I claim is:

1. The process of separating an arylamine that is substantially insoluble in water and has a melting point above that of water from an aqueous solution containing dissolved impurities, consisting in dispersing the arylamine in the aqueous solution at a temperature above the melting point of the arylamine, thereafter cooling the dispersion sufficiently to solidify the arylamine in congealed spheres while maintaining the aqueous phase in the liquid state, and finally separating the solidified arylamine spheres from the aqueous solution containing the dissolved impurities.

2. The process of claim 1, further characterized in that the arylamine is an aminodiphenyl.

3. The process of treating an arylamine that is substantially insoluble in water and has a melting point above that of water, which arylamine is associated with alkali-soluble phenolic bodies and an aqueous solution containing impurities, consisting in dispersing the arylamine in the aqueous solution at a temperature above the melting point of the arylamine, subsequently cooling the dispersion sufficiently to solidify the arylamine in congealed spheres while maintaining the aqueous phase in the liquid state, and separating the solidified arylamine spheres from the aqueous solution containing the dissolved impurities, and thereafter remelting and redispersing the solidified arylamine freed from the aqueous solution containing impurities at a temperature above the melting point of the arylamine in sufficient aqueous solution of an alkali to dissolve the phenolic bodies, cooling said dispersion sufficiently to resolidify the arylamine in congealed spheres while maintaining the aqueous phase in the liquid state, and separating the resolidified arylamine spheres from the aqueous phase containing the dissolved alkali-soluble phenolic bodies.

4. The process of claim 3, further characterized in that the arylamine is an aminodiphenyl.

5. The process of purifying from associated alkali-soluble phenolic bodies, an arylamine substantially insoluble in water and having a melting point above that of water, which arylamine is free from water-soluble impurities that are precipitated by alkali, characterized in that the arylamine containing the impurities is melted and dispersed at a temperature above the melting point of the arylamine in sufficient aqueous solution of an alkali to dissolve the phenolic bodies and the dispersion is thereafter cooled sufficiently to solidify the arylamine in congealed spheres while maintaining the aqueous phase in liquid state, and thereafter separating the solidified arylamine from the aqueous phase containing the dissolved alkali-soluble phenolic bodies.

6. The process of claim 5, further characterized in that the arylamine is an aminodiphenyl.

7. The process of recovering an arylamine substantially insoluble in water and having a melting point above that of water, from a reaction mixture resulting from the ammonolysis of an aryl halide, characterized in that the reaction mixture is melted and dispersed in water at a temperature above the melting point of the arylamine, and the dispersion is thereafter cooled sufficiently to solidify the arylamine in congealed spheres while maintaining the aqueous phase in liquid state, and thereafter separating the solidified arylamine from the aqueous phase containing dissolved water-soluble impurities.

8. The process of claim 7, further characterized in that the solidified and separated arylamine is further purified from alkali-soluble phenolic bodies by remelting and redispersing the arylamine at a temperature above the melting point of the arylamine in sufficient aqueous solution of an alkali to dissolve the phenolic bodies, and the dispersion is thereafter cooled sufficiently to solidify the arylamine in congealed spheres and maintain the aqueous phase in liquid state, and thereafter separating the solidified arylamine from the aqueous phase containing the dissolved alkali-soluble phenolic bodies.

9. The process of recovering an aminodiphenyl from the reaction mixture resulting from the ammonolysis of a diphenyl halide, which comprises melting and emulsifying the molten aminodiphenyl in the aqueous reaction mixture, cooling said emulsion below the freezing point of the aminodiphenyl and separating the aminodiphenyl from the aqueous medium.

10. The process of claim 9, further characterized in that the separated aminodiphenyl is further purified from alkali-soluble phenolic bodies by remelting and redispersing the aminodiphenyl at a temperature above the melting point of the arylamine in sufficient aqueous solution of an alkali to dissolve the phenolic bodies, and the dispersion is thereafter cooled sufficiently to solidify the arylamine in congealed spheres and maintain the aqueous phase in liquid state, and thereafter separating the solidified arylamine from the aqueous phase containing the dissolved alkali-soluble impurities.

RUSSELL L. JENKINS.